United States Patent [19]
Pendleton

[11] 3,717,055
[45] Feb. 20, 1973

[54] PORTABLE TOOL FOR REFACING DRILL PIPE

[76] Inventor: Earl M. Pendleton, 5446 Apple Creek, Houston, Tex.

[22] Filed: Feb. 1, 1971

[21] Appl. No.: 111,356

[52] U.S. Cl. .................................................82/4 C
[51] Int. Cl. .................................................B23b 3/22
[58] Field of Search .....................................82/4 C

[56] References Cited

UNITED STATES PATENTS

| | | | |
|---|---|---|---|
| 3,124,024 | 3/1964 | Pittman | 82/4 C |
| 3,540,328 | 11/1970 | Foss | 82/4 C |
| 2,211,183 | 8/1940 | Tytus et al. | 82/4 C |
| 2,159,287 | 5/1939 | Morgan | 82/4 C |

*Primary Examiner*—Leonidas Vlachos
*Attorney*—Arnold, White & Durkee, Tom Arnold, Robert A. White, Bill Durkee, Frank S. Vaden, III, Louis T. Pirkey and John F. Lynch

[57] ABSTRACT

Apparatus is provided for refacing pipe sections, the apparatus including a housing, a rotatable cutting head mounted on the housing by means of roller bearings and including thereon plural replaceable and adjustable cutting elements for cutting the desired surfaces of the pipe section, a feed screw for moving the cutting head longitudinally toward and away from the pipe section, and a threaded section operable to detachably secure the apparatus to the pipe section by rotation of said section. Rotation of the cutting head is provided by a ring gear which is operably connected to a source of power such as a small electric motor.

11 Claims, 9 Drawing Figures

Earl M. Pendleton
INVENTOR.

BY Arnold, White & Durkee

Earl M. Pendleton
INVENTOR

BY Arnold, White & Durkee
ATTORNEYS

Earl M. Pendleton
INVENTOR.

BY Arnold, White & Durkee

ATTORNEYS

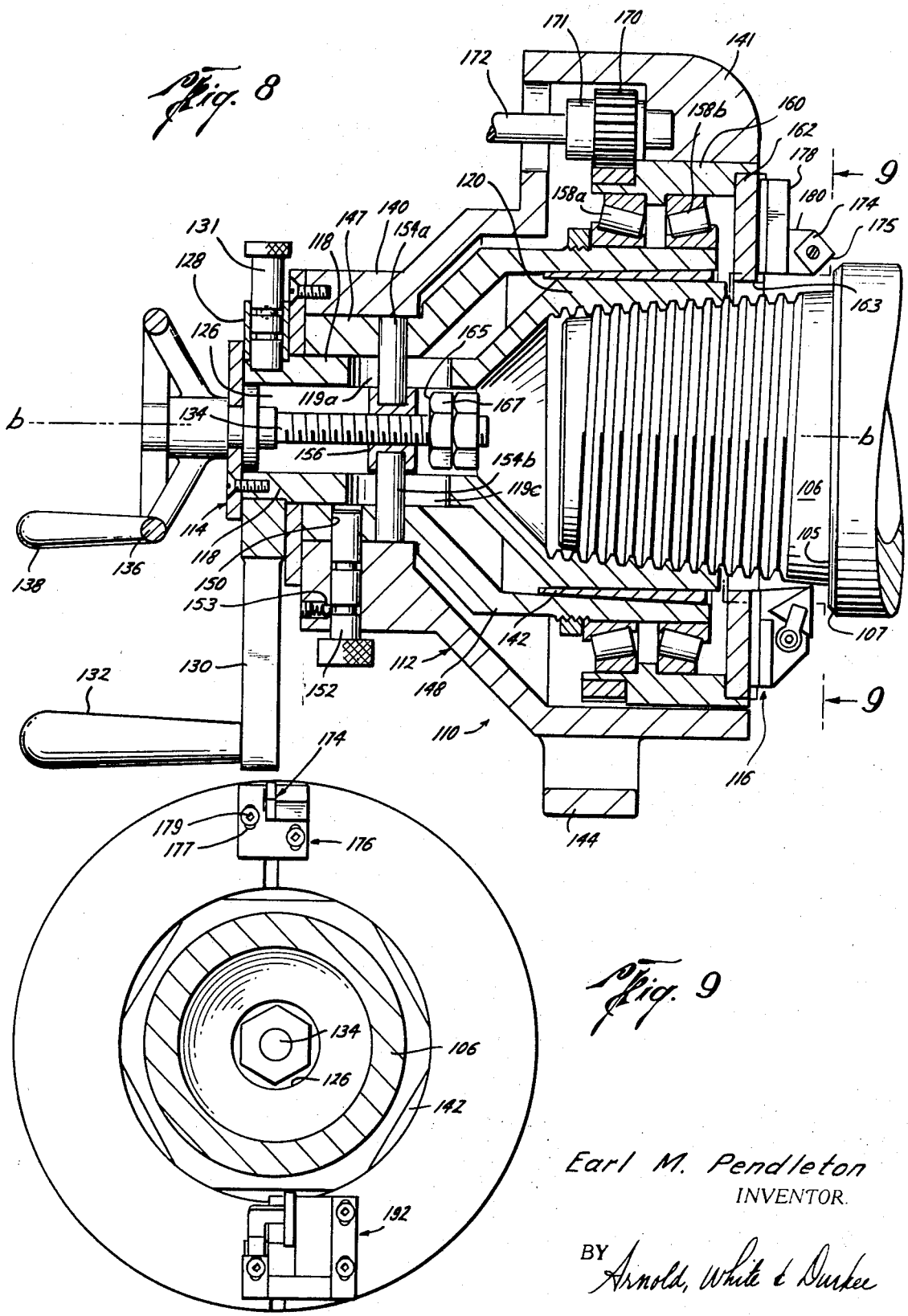

PORTABLE TOOL FOR REFACING DRILL PIPE

BACKGROUND OF THE INVENTION

The invention relates to portable apparatus for refacing pipe, and has particular application to the refacing of drill pipe.

In the drilling of wells such as oil and gas wells, the driller utilizes many sections (or "joints") of threaded drill pipe. The individual sections are conveniently threaded together to form the drill string through which it is customary to circulate a drilling fluid (such as drilling mud) under pressure during the drilling process. Typically, the joints of drill pipe have at one end a male or "pin" connection, and at the other end a female or "box" connection. Box and pin connections are illustrated in these drawings, FIGS. 1 and 8, at 2 and 102, respectively.

It is important during the drilling process to maintain fluid-tight connections between the various joints of drillpipe. For this reason, the connection between pin and box is quite important, and it is critical that there be little or no fluid leakage.

It is apparent that to maintaining a fluid-tight seal between pin and box connections, the threads of one connection must be perfectly aligned with the threads of the other. This alignment is difficult to maintain during drilling because of the frictional contact during makeup of the drill string, and frictional wear of the connections during the drilling process under the extreme environmental conditions existing in the borehole. Since the joints of drill pipe are usually separated from the drill string, stacked, and used again, there is a special problem since adjacent connections will have been subjected to different amounts of wear and therefore will not mate as well as connections which have been subjected to identical wearing conditions.

More complete explanation of the problems of fluid seal in pin and box connections may be found in the application of Howard N. Keener, Ser. No. 723,843, filed Apr. 24, 1968, now U.S. Pat. No. 3,561,302.

Because of the necessity of maintaining a fluid-tight seal at the pin and box connections, it is often necessary to reface the inside bevel 5, end face 6, and outside bevel 7 of the box connection 2 (FIG. 1) if the joint is to retain its useful life. Similarly, it is often necessary to reface the end face surface 105 and outside bevel 107 of pin member 102 (FIG. 8).

Various types of machines have been used for such resurfacing, such as that shown in the aforementioned U.S. Pat. No. 3,561,302. But all of the prior art apparatus known to the inventor suffers from one or more of a number of very distinct disadvantages.

One primary disadvantage of prior art apparatus has been the heavy and bulky nature of the apparatus which has prevented field utilization of the apparatus. Consequently, it has often been necessary to transport pipe joints from remote locations to distant points at which the joints may be refaced.

Another distinct disadvantage of the prior art has been the necessity for turning of the pipe being refaced, and/or fixed attachment of the apparatus to the pipe being refaced.

Still another disadvantage of the prior art has been the necessity to adjust or sharpen the cutting elements, thus often resulting in cutting elements which are out of calibration.

Yet another disadvantage of the prior art has been the inability in much prior art apparatus to simultaneously reface various of the surfaces.

Another disadvantage of certain prior art apparatus has been the necessity for utilization of rather experienced operators and the difficulty and expense in locating such operators.

It would be desirable if small portable apparatus could be provided which could be successfully used to reface the critical surfaces of drill pipe connections. Such apparatus is provided by the present invention.

It would further be desirable to provide apparatus of the above-mentioned type which could be operated by the inexperienced operator. Such apparatus is provided by this invention.

It would be desirable to provide apparatus of the type mentioned above, which does not require turning of the pipe or affixing to the pipe. This invention provides such apparatus, making it possible to stack a plurality of joints of pipe in racks and move the portable apparatus of this invention down such racks, refacing the connection surfaces of each joint seriatim.

It would also be desirable to provide apparatus which would make it prevent the use of out-of-calibration cutting elements. This invention provides inexpensive cutting elements which, rather than being adjusted or field-sharpened upon dulling, may simply be discarded, and replaced with a similar inexpensive element.

It would also be desirable to provide apparatus of the above mentioned type, which would simultaneously reface the various surfaces of pin or box connection. Such apparatus is provided by this invention, and the apparatus of the invention is capable of performing the necessary operations in a very short period of time.

The apparatus provided by the present invention may be operated by an inexperienced operator. It may be powered by a small electric motor. It may be utilized in the field, to thereby eliminate transportation of pipe and thereby relieve the inventory problems which otherwise exist.

Other advantages of the present invention will be apparent from the discussion which follows.

SUMMARY OF THE INVENTION

The invention provides apparatus which overcomes the disadvantages of the prior art as discussed above.

The present invention comprises apparatus which includes a housing, means for detachably securing the apparatus to a pin or box member, a cutting head rotatable on said housing, cutting elements on the cutting head to reface the various desired surfaces of the pin or box member, and means for moving the rotatable cutting head into position adjacent the pin or box member.

Means for detachably securing the apparatus to the pin or box member desirably comprise in accordance with the invention, a threaded adaptor portion which is rotatably engaged with the threads of pin or box member by rotating a centrally disposed slide member by means of a handle. The means for moving the rotatable cutting head into position adjacent the pin or box member desirably comprises a feed screw which moves the cutting head longitudinally along the axis of the pipe member to be resurfaced independent of the adaptor portion which engages the threads of the pipe. The feed screw is desirably turned by rotating a handle which protrudes from the housing.

The cutting elements in accordance with the invention are desirably small replaceable cutting elements which, after becoming dulled, may simply be turned to expose a different face as the cutting surface, and may thereafter be discarded with a new cutting element installed in its place.

The cutting head is rotated by means such as a ring gear which may be powered by a small electric motor such as those generally available in the field.

BRIEF DESCRIPTION OF THE DRAWINGS

In order that the invention may be more clearly understood, it will be explained in terms of particularly preferred embodiments which represent the best mode known to applicant at the time of this application. Such embodiments are illustrated in the accompanying drawings which form a part of this specification and wherein:

FIG. 8 is a view similar to FIG. 1, but showing another embodiment of the invention which embodiment is suitable for refacing the surfaces of a pin member; and, FIG. 9 is a view taken along the line 9-9 of FIG. 8.

DETAILED DESCRIPTION OF ILLUSTRATED EMBODIMENTS

In order to more completely describe the preferred embodiments of the invention, reference may first be had to the embodiment shown in FIGS. 1-7.

Figure 1:
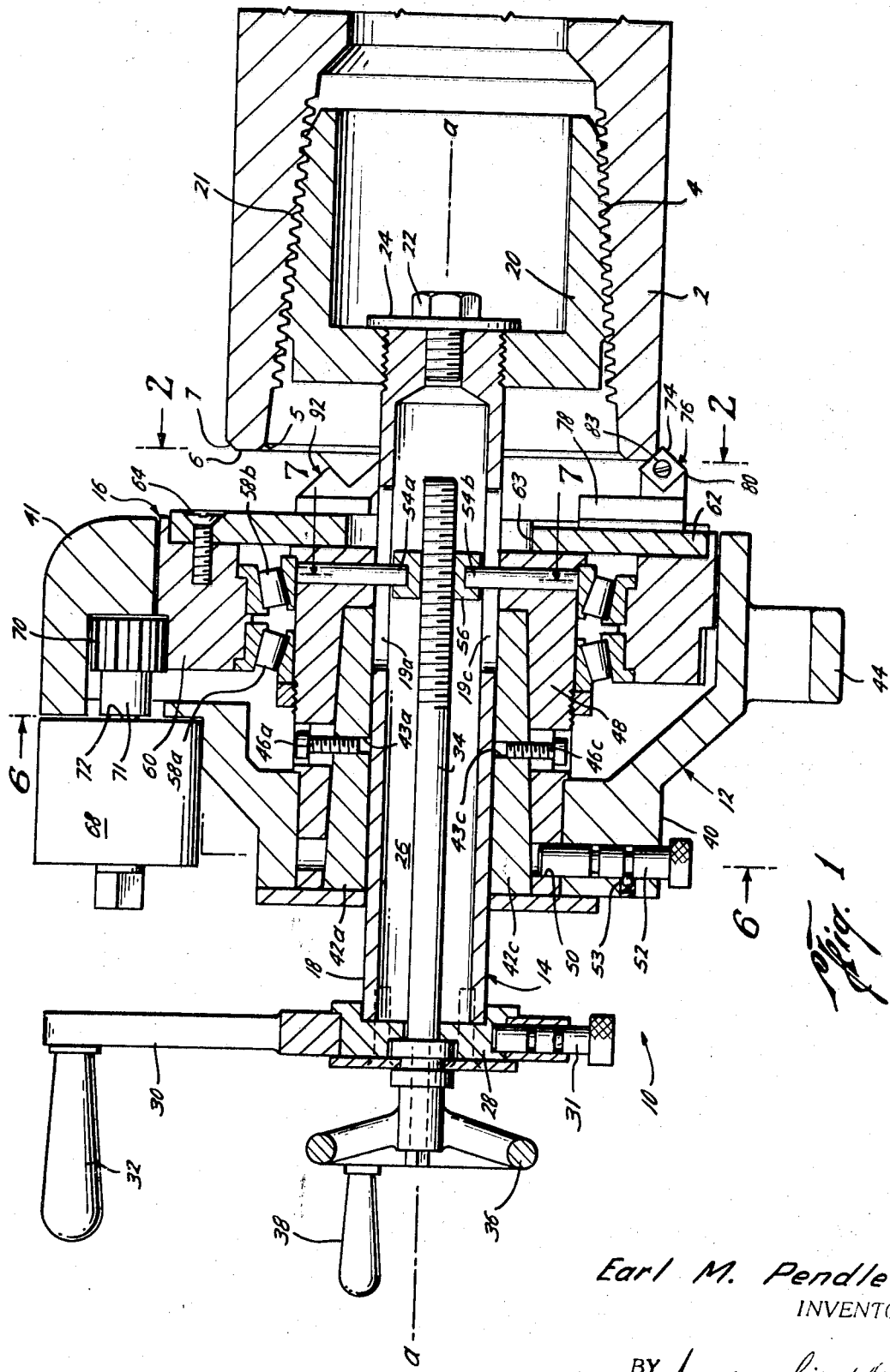
FIG. 1 is an elevational view, in section, illustrating an embodiment of the invention suitable for refacing box members.

The portable refacing unit 10 of small size as seen in FIG. 1, comprises generally housing means such as the outer housing 12, means for positioning the apparatus in proper orientation against the surfaces to be refaced such as the inner core portion 14, and a rotatable cutting head 16.

The central longitudinal axis $a—a$ of the pipe joint to be refaced is coincident to the longitudinal axis of the apparatus of this invention when that apparatus is in its working position such as seen in FIG. 1, so the apparatus will be described in terms of the axis $a—a$ as a central reference axis.

The inner core portion 14 of the unit 10 extends substantially symmetrically about the axis $a—a$. This portion comprises an elongate body portion or slide 18. The outer periphery of the slide 18 in this embodiment forms a square, while the inner periphery forms a circle, leaving a longitudinally extending hollow portion 26 through the axial area of the slide.

At one end of the slide 18 are means for removably affixing the slide to the connection to be refaced, and at the other end of the slide are means for facilitating engagement of said means with the connection and means for moving the cutting head into operative cutting position adjacent the surfaces to be refaced.

In this embodiment the means for removably affixing the slide to the connection to be refaced comprises a tubular-shaped thread adaptor 20 having an externally threaded portion which mates with the threads of the box member to be refaced. The thread adaptor may be securely affixed to the slide 18 by any convenient means, as by the threaded engagement at 21 with an externally threaded segment of the slide at its extremity adjacent said adaptor, and by the nut 22 with washer 24 which threads into a threaded hole in the filled end of the slide 18.

The threaded portion of thread adaptor 20 is tapered to a decreasing diameter as the distance from the slide 18 increases, in order that there may be perfect mating relationship with the standard box fitting 2.

Located at the end of the slide 18 opposite the thread adaptor 20, the means for facilitating engagement of the thread adaptor into the connection to be refaced, desirably comprise as in this embodiment a socket 28 into which fits an arm 30 connected to a handle 32. Turning of the handle 32 is thus effective to turn the slide 18 and thus the thread adaptor 20, thereby turning thread adaptor 20 into firm engagement with the threads of the box member 2. Means are desirably included for holding the handle 32 out of the way of the operator during other operations, such means desirably including the pin 31 fitting into the socket 28 on the side thereof opposite the handle 32.

Means for moving the cutting head into operative cutting position desirably comprise as in this embodiment, a feed screw 34 located along the central longitudinal axis $a—a$. The feed screw 34 is turned by handle 38 operating a wheel 36. Operation of the feed screw in moving the cutting head into operative cutting position will be described below.

The slide 18 contains therein a couple of longitudinally extending slots 19a, 19c disposed approximately 180° apart, which slots are located near the end of the slide adjacent the thread adaptor 20.

The outer housing 12 of the unit 10 includes a body portion 40 having a protruding housing portion 41 at the top thereof, and a tapered ring 48. The ring 48 has a couple of pins 54a, 54b affixed thereto, the pins 54 being disposed approximately 180° from each other and protruding through the slots 19 into the hollow central portion 26 of the slide 18. Each pin 54 is securely affixed to a circular block 56 which is threadedly engaged by the feed screw 34, thereby to move the tapered ring 48 (and hence the outer housing 12) upon turning of the feed screw.

The tapered ring 48 rests upon gibs 42a, 42b, 42c, 42d and is adjustable with respect thereto by means of the apertures 43 (two of which, 43a and 43c are illustrated in FIG. 1) and set screws 46 extending therethrough.

Figure 6:
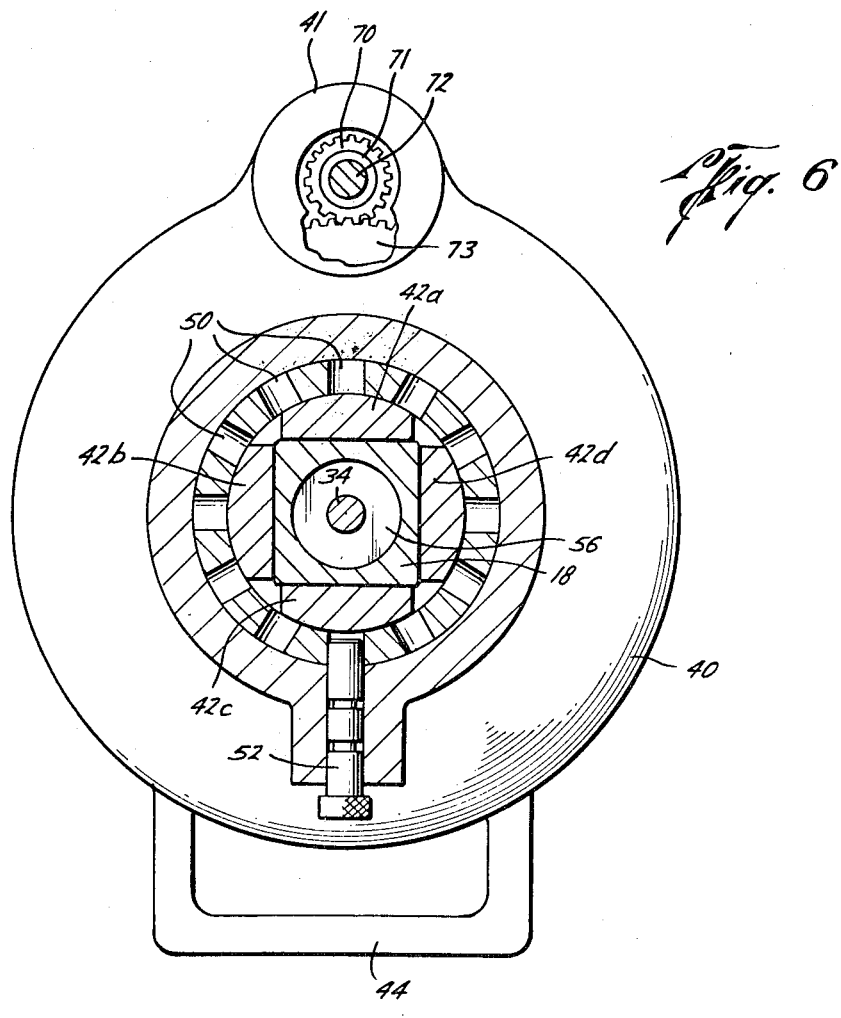
FIG. 6 is a view taken along the line 6—6 of FIG. 1.
Figure 7:
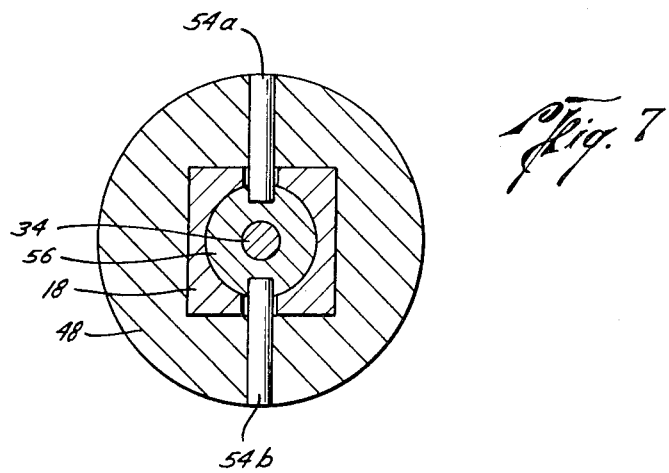
FIG. 7 is a view taken along the line 7—7 of FIG. 1.

Means for preventing movement of the housing during rotation of the cutting head are desirably included, and such means advantageously include a pin 52 which is disposed in one of a plurality of openings 50 located around the periphery of the body 40 (See FIGS. 1 and 6). The body of the pin 52 is desirably grooved as indicated in FIG. 1, with a resilient member such as the spring 53 adapted for fitting into said grooves to lock the pin 52 in place.

A carrying arm 44 is desirably included on one side of the body 40 for convenient pickup, carrying and holding of the unit 10. Such arm might be of any convenient type.

The cutting head 16 is operably connected to the outer housing 12 and rotates with respect thereto by means of the roller bearings 58, one pair of which are illustrated at 58a, 58b. The cutting head is thus operable to move axially with the outer housing, but may rotate freely around the outer housing in a circle concentric with the axis a—a upon the roller bearings 58. The cutting head 16 comprises in this embodiment a ring 60 fitted to turn on the bearings 58, and a flat circular face member 62 disposed perpendicular to the axis a—a. The face plate member 62 is adjustably connected to the ring 60 by means of the screws 64.

The face plate 62 has a large opening 63 concentric with the axis a—a of sufficient size to accommodate the protrusion of the slide 18 therethrough.

Figure 2:
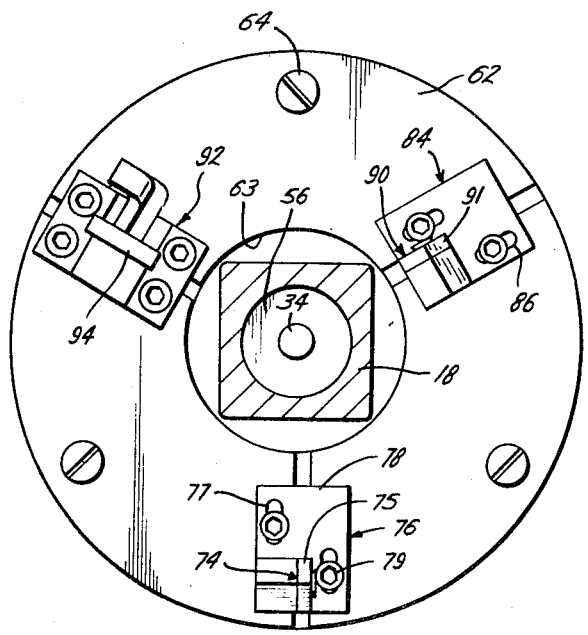
FIG. 2 is a view along the line 2—2 of FIG. 1.
Figure 3:
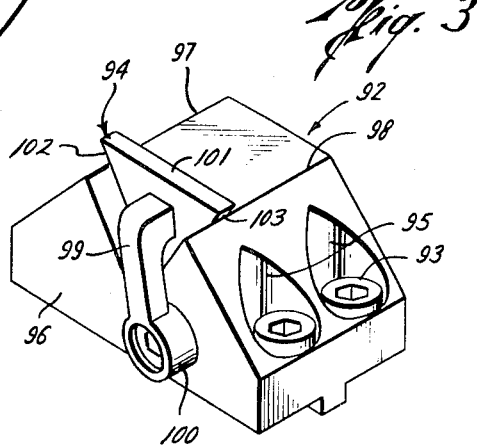
FIG. 3 is a pictorial view of a cutting element useful in the apparatus of FIG. 1, suitable for refacing the face 6 of the box member 2.

Replaceable individual cutting elements are positioned on the face 62 of the cutting head 16, desirably as illustrated in FIG. 2. Here is seen for use in this embodiment for refacing the appropriate surfaces of the box member 2, the ID (inside diameter) bevel cutter 84, the OD (outside diameter) bevel cutter 76, and the face cutter 92. The individual tools according to this embodiment of the invention are more fully illustrated in FIGS. 3, 4, and 5, and will be further described herebelow.

The replaceable individual cutting tools 76, 84, and 92 are desirably spaced on the face plate 62 at about the same distance from the axis a—a, and at intervals of approximately 120° therearound. Each tool has a cutting element which comprises a thin flat plate in the shape of an equilateral polygon. In these examples, the plate is in the form of a square or equilateral triangle.

Figure 4:
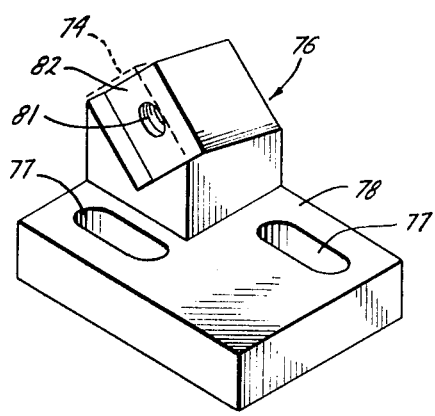
FIG. 4 is a pictorial view of a cutting element useful in the apparatus of FIG. 1, suitable for refacing the outside bevel face 7 of the box member 2.

The OD bevel tool shown in FIG. 4 comprises a relatively large base portion 78 which is adapted for attachment on the face 62 of the cutting head, and an upstanding portion 80 projecting therefrom in a direction (when the cutting tool is installed, as shown in FIG. 1) toward the OD bevel surface to be refaced. Longitudinal slots 77 are included in the base 78 and the base is attached to the face 62 by means of screws 79 fitting through these slots. The elongated slots permit adjustment of the tool 76 in the direction of such slots merely by positioning of the screws 79 therein. The entire cutting tool is thus adjustable to move the cutting element radially toward or away from the desired surface, but the cutting element itself is nonadjustable. Rather, this element is turned or replaced when dulled. In this manner, improper adjustment of the cutting element itself is prevented while permitting simple adjustment of the cutting tool.

The upstanding projection 80 presents a flat support surface 82 which has a threaded opening approximately centrally disposed therein. The support surface 82 is adapted to support the replaceable cutting element 74 which is readily affixed thereto by means of the screw 83 (FIG. 1) fitting into the threaded hole 81. The thin, flat square-shaped cutting element 74 presents four like surfaces, one of which is a cutting surface 75 which is effective to reface the OD bevel surface 7 of box member 2 as the cutting head rotates about the central axis a—a.

As will be readily understood, when the cutting surface 75 of the element 74 becomes dulled, the small element may be rotated to present another of the four like faces as the cutting face. After each such face has been dulled, the element is quickly and readily replaced merely by removing the screw 83 and the cutting element 74, and substituting a new element.

Figure 5:
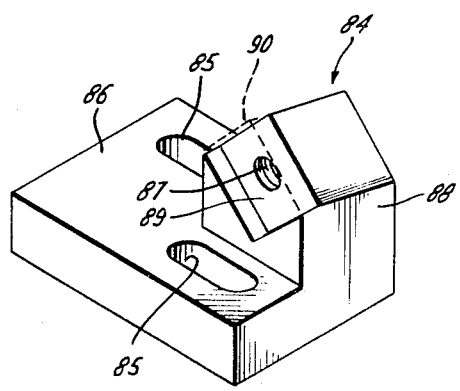
FIG. 5 is a pictorial view of a cutting element useful in the apparatus of FIG. 1, suitable for refacing the inside bevel face 5 of the box member 2.

The cutting tool 84 shown in FIG. 5 is substantially identical to the tool 76 except for the location on the base 86 of the tool, of the upstanding projection 88. The slots 85 like the slots 77 provide for adjustment of the cutting tool along the line of the slots. Similarly, the surface 89 of upstanding projection 88 presents a support surface against which a removable cutting element 90 having four like faces, one of which is a cutting face 91, is adapted to be positioned. Easy realignment and removal and replacement of cutting elements is provided by the threaded hole 87 into which a suitable screw is adapted to be fitted, in the same manner as described above in connection with the cutting tool 76.

The face cutting tool 92 comprises a generally solid block base portion 96 which has a cutaway along a lateral axis thereof, the cutaway forming a couple of angular support surfaces 97 and 98 forming in cross section a V-shape along said lateral axis. A triangular shaped cutting element 94 of sides 101, 102, and 103 fits into this V-shaped recess in such a manner that one of the sides 102 is supported by the surface 97 and another of the sides 103 is supported by the surface 98. The top surface of the equilateral-triangle shaped cutting element, surface 101, is thus exposed as the cutting surface to act against the face 6 of box member 2. When the surface 101 is dulled the element 94 may be turned to provide a fresh cutting surface, and then when each of the surfaces 101, 102, and 103 has become dulled, the element 94 is easily replaced by a similar element.

The cutting member 94 is detachably retained in the base 96 by means of an arm 99 and socket 100, retained by a screw 104. The base 96 of the cutting tool is retained on the cutting head by suitable means such as the screws 93 in the recesses 95.

The cutting head 16 is driven by the ring gear 70 which may be powered by any suitable means.

In this embodiment, the cutting head 16 is provided with a sprocket wheel 73 (See FIG. 6) which is driven by means of the ring gear 70 turning on a core 71 mounted on a shaft 72. The shaft may be turned by any suitable means, but in this embodiment it is by means of a small electric motor 68. Desirably in accordance with this invention, a small electric motor (three-fourths horsepower, 110 volt) which is readily available at sites in the FIGS. is useful for this purpose.

THE EMBODIMENT OF FIGURES 8–9

In FIGS. 8 and 9 is illustrated a further embodiment of the invention, this embodiment being useful to resurface the appropriate faces of a pin member rather than the box member refaced by the apparatus of the FIGS. 1–7 embodiment.

The pin member 106 presenting face surface 105 and OD bevel surface 107 is shown in position for operation in the refacing unit 110 of the FIGS. 8–9 embodiment.

Like the unit 10 of the FIGS. 1–7 embodiment, the apparatus 110 may be considered to comprise generally an outer housing 112, an inner core 114, and a rotatable cutting head 116. Also like the unit 10, the unit 110 is disposed about a central longitudinal axis b—b which is coincident with the central longitudinal axis of the pin member 106.

The inner core portion 114 of the unit 110 extends substantially symmetrically about the b—b axis. This portion comprises an elongate body portion or slide 118 which may be similar to the slide 18 of the FIGS. 1–7 embodiment at the main body portion thereof opposite the pin member 106, but toward the end adjacent the pin member 106, the slide 118 is radially outwardly flared to terminate in means for attaching the slide to the connection to be refaced, such as the internally threaded thread adaptor portion 120. The portion 120 is adapted to threadedly engage and mate with the threads of the pin member 106.

The main body portion of the slide 118 is equipped with a couple of slots 119a, 119b, extending for a short distance along the axis b—b. As in the FIGS. 1–7 embodiment, the slide 118 defines a central longitudinal hollow portion 126 extending through the main body thereof.

At the end of the slide 118 opposite the pin member 106, is means for facilitating engagement of the thread adaptor with the connection, and means for moving the cutting head 116 into operative cutting position adjacent the surfaces to be refaced. In this embodiment of the invention, such means for engaging the thread adaptor 120 desirably comprise a socket 128 into which fits an arm 130 which may be conveniently turned by a handle 132. Turning of the handle 132 is thus operative to turn the slide 118 and the thread adaptor 120, sufficient turning in this manner thereby enabling firm threaded engagement of the thread adaptor with the pin member 106.

Means for moving the cutting head 116 into operative engagement with the pin member 106, desirably comprise a feed screw 134, located along the axis b—b. The feed screw 34 is desirably turned by a handle 138 operating a wheel 136 rotating with the feed screw 134.

The outer housing 112 of the unit 110, includes a body portion 140 having at the top thereof in the FIG. 8 orientation, a protruding housing portion 141, and an annular inner portion 148 which terminates at the end thereof nearest the pin member 106, in a longitudinally extending tapered ring 148.

The tapered ring 148 rides on gibs 142 which separate the ring 148 from the exterior surface of the thread adaptor 120.

The inner portion 147 which is integral in this embodiment with the ring 148, being connected thereto by a flared portion 145, and is equipped with a couple of pins 154a, 154b, which project radially inwardly through the slots 119a, 119b, respectively, in the slide 118, into the hollow central portion 126 of the slide 118. Each pin 154 is securely affixed to a circular block 156 which is threadedly engaged by the feed screw 134 (in this connection it will generally be desirable to use a left-handed feed screw 134 to prevent disengagement upon turning with the block 156) thereby to move the inner portion 147 and hence the outer housing 112 upon turning of the feed screw 134.

Means for preventing movement of the housing during rotation of the cutting head are desirably provided, and such means desirably include a pin 152 which is disposed in one of a plurality of holes 150 located around the periphery of the body 140, the pin 152 being grooved to cooperate with a spring 153.

As in the FIGS. 1–7 embodiment, a carrying arm 144 is desirably included on one side of the body 140 for convenient pickup, carrying and holding of the unit 110. Such arm might be of any convenient type, such as that illustrated in FIG. 8 and shown in the previously described embodiment in FIGS. 1 and 6.

The cutting head 116 is operably connected to the outer housing 112 and rotates with respect thereto, by means of the roller bearings 158a, 158b. The cutting head is thus operable to move axially with the housing 112 but is free for rotation therearound (around the axis b—b) while the housing 112 is stationary.

The cutting head 116 in this embodiment, comprises a ring 160 fitted to turn on the bearings 158, and a flat circular face member 162 disposed perpendicular to the axis b—b. The face plate member 162 has a large opening 163 centrally disposed therein of a size sufficient to accommodate the threaded portion of the pin member 106 therein.

As in the FIGS. 1–7 embodiment, replaceable cutting tools are provided on the face 162 of cutting head 116, as illustrated in FIGS. 8 and 9. However, since only two cutting tools are required for the pin member 106, these being an OD bevel cutting tool 176 and a face cutting tool 192.

The cutting tools 176 and 192 are desirably substantially equidistantly spaced around the periphery of the face 162, in this embodiment therefore being approximately 180° apart.

The OD bevel tool 176 is like the OD bevel tool 74 shown in the FIGS. 1–7 embodiment and best illustrated in FIG. 4. The tool 176 comprises a base portion 178 and an upstanding portion 180, the base being adjustably affixed to the face 162 by means of screws 179 which fit in elongate slots 177. A cutting element 174 presents a cutting surface 175 with three similar surfaces which are useful after the surface 175 has become dulled in use.

Likewise, the cutting tool 192 is similar to the cutting tool 92 of the FIGS. 1–7 embodiment.

As previously stated, the individual cutting tools are readily replaceable in the field by the inexperienced worker, and this is one of the desirable attributes of the present invention.

Similar to the FIGS. 1–7 embodiment, the cutting head 116 is turned by a ring gear 170 turning on a shaft 172, which may be powered by a small electric motor of the type readily available in the field, as mentioned heretofore.

Means are desirably included to ensure that the faces 105 and 107 are not cut too deeply. Such means desirably comprise in this embodiment, the inner face 165 of the nut 167, which serves as a stop means upon engagement with the adjacent surface of the block 156. Once there is contact between the surface 165 and the block 156, the pin member can move no closer to the cutting tools and thus it is assured that the surfaces 105, 107 will not be damaged by excessive cutting.

From the above description, it is seen that apparatus is provided by this invention which does not require turning of the pipe joint to resurface the various faces of pin and box members. Neither does the apparatus of the invention require affixation of the apparatus to the pipe. Rather, the apparatus is desirably detachably connected to the pipe as described above.

Further, it is seen that the invention provides a lightweight, portable apparatus which may be powered by a small electric motor of the type readily available in the field.

It is further seen that apparatus is provided whereby pipe may be stacked in racks, and the apparatus moved down the rack to reface each member seriatim.

The invention provides inexpensive replaceable cutting tools which can be rotated to expose a new face, and then thrown away when dulled. Since the cutting tools are not adjusted or field-sharpened, there is no risk, as there is in prior art tools, of cutting the surfaces out of calibration or alignment.

The invention provides for the first time, a small practical refacing tool which can be used in the field—thereby avoiding costly downtime especially where offshore applications are concerned—by inexperienced personnel, having the advantages mentioned above, and being economical, providing simultaneous cutting in a very short time (3 minutes is usually sufficient for the embodiments disclosed) of the various faces to be resurfaced, in a manner such that the pipe is refaced true to the threaded seat and thread axis, to assure no loss of pressure in drill fluids circulated through the pipe after the pipe has been returned to service.

Although the invention has been described in terms of particularly preferred embodiments which represent the best mode of the invention known to the applicant at the time of this application, it will be apparent to those of skill in the art that various modifications might be made in the structures herein described, without departing from the scope of the invention which is defined in the appended claims.

What is claimed is:

1. Lightweight, portable apparatus suitable for field use to reface desired surfaces of a pipe member comprising:
    a housing adapted to receive said pipe member in a manner such that the longitudinal axis of said pipe member is coincident with the longitudinal axis of said housing;
    a rotatable cutting head mounted on said housing, in a manner such that said cutting head is movable longitudinally along said axes with said housing but is rotatable about said axes independent of said housing;
    at least one cutting tool mounted on said cutting head in a manner such that the desired surfaces of said pipe member may be refaced as said cutting tool rotates about said axes on said cutting head;
    means including
        a threaded section adapted to mate with the threads of said pipe member, said section being carried on a slide member extending along said axes and having at least two longitudinally extending slots therein, and a hollow central portion along said axes,
    for detachably securing said apparatus to said pipe member;
    a feed screw disposed in said hollow central portion and connected with pins extending through said slots, rotating of said feed screw being effective to move said housing and said cutting head axially but such rotation not causing movement of said slide and threaded section; and,
    means on said housing for rotating said cutting head.

2. Apparatus in accordance with claim 1, said slide member being connected to a handle at the end thereof opposite said pipe member, and said handle being operable upon turning to rotate said engagement with said pipe member.

3. Apparatus in accordance with claim 1, wherein said cutting tool includes a cutting element which has plural surfaces adapted for cutting the desired surface, and wherein said element is detachably mounted on said cutting head in a manner such that the element may be readily and easily turned to present a different face as a cutting surface after one such surface becomes dulled in operation.

4. Apparatus in accordance with claim 3, wherein said cutting element is a thin flat member in the shape of an equilateral polygon, said cutting element being readily detachably mounted against a support surface on said cutting tool.

5. Apparatus in accordance with claim 4, wherein said cutting tool comprises a base and an upstanding portion, said upstanding portion presenting said support surface, and said base being secured to said cutting head by fastening means therein, said fastening means extending through elongate slots in said base in a manner such that said cutting tool may be readily adjusted to move said cutting surface toward or away from said pipe member.

6. Apparatus in accordance with claim 1, wherein said means for rotating said cutting head comprises a ring gear, said housing including teeth for meshing with said ring gear.

7. Lightweight, portable apparatus suitable for field use to reface desired surfaces of a pipe member comprising:
    a housing adapted to receive said pipe member in a manner such that the longitudinal axis of said pipe member is coincident with the longitudinal axis of said housing, said housing including roller bearings mounted concentrically around said axes;
    a rotatable cutting head mounted on said roller bearings such that said cutting head is movable longitudinally along said axes with said housing but is rotatable about said axes independent of said housing;
    at least one cutting tool mounted on said cutting head in a manner such that the desired surfaces of said pipe member may be refaced as said cutting tool rotates about said axes on said cutting head;
    means including
        a threaded tubular section adapted to mate with the threads of said pipe member, said section being carried on
        a slide member extending along said axes and having at least two longitudinally extending slots therein, and a hollow central portion along said axes, and
        a handle at the end of said slide member opposite said threaded section, said handle being operable upon turning to rotate said housing and to move said threaded section into mating threaded engagement with said pipe member;

for detachably securing said apparatus to said pipe member;

a feed screw disposed in said hollow central portion and connected with pins extending through said slots, rotating of said feed screw being effective to move said housing and said cutting head axially but such rotation not causing movement of said slide and threaded section; and, means on said housing for rotating said cutting head.

8. Apparatus in accordance with claim 7, wherein said cutting tool includes a cutting element which has plural surfaces adapted for cutting the desired surface, and wherein said element is detachably mounted on said cutting head in a manner such that the element may be readily and easily turned to present a different face as a cutting surface after one such surface becomes dulled in operation.

9. Apparatus in accordance with claim 8, wherein said cutting element is a thin flat member in the shape of an equilateral polygon, said cutting element being readily detachably mounted against a support surface on said cutting tool.

10. Apparatus in accordance with claim 9, wherein said cutting tool comprises a base and an upstanding portion, said upstanding portion presenting said support surface, and said base being secured to said cutting head by fastening means therein, said fastening means extending through elongate slots in said base in a manner such that said cutting tool may be readily adjusted to move said cutting surface toward or away from said pipe member.

11. Apparatus in accordance with claim 7, wherein said means for rotating said cutting head comprises a ring gear, said housing including teeth for meshing with said ring gear.

* * * * *